(12) United States Patent
Trickey et al.

(10) Patent No.: US 8,404,340 B2
(45) Date of Patent: Mar. 26, 2013

(54) PERMEABLE FILMS

(75) Inventors: Lynden William Trickey, Mont Albert (AU); Jeffrey Ernest Peck, Langwarrin (AU)

(73) Assignees: Lynden William Trickey, Victoria (AU); Jeffery Ernest Peck, Victoria (AU)

( * ) Notice: Subject to any disclaimer, the term of this patent is extended or adjusted under 35 U.S.C. 154(b) by 925 days.

(21) Appl. No.: 12/063,414

(22) PCT Filed: Aug. 11, 2006

(86) PCT No.: PCT/AU2006/001145
§ 371 (c)(1),
(2), (4) Date: Mar. 31, 2008

(87) PCT Pub. No.: WO2007/016748
PCT Pub. Date: Feb. 15, 2007

(65) Prior Publication Data
US 2010/0159172 A1     Jun. 24, 2010

(30) Foreign Application Priority Data
Aug. 11, 2005   (AU) ............................... 2005904342

(51) Int. Cl.
*B32B 3/26* (2006.01)
*B32B 3/10* (2006.01)
*B32B 3/00* (2006.01)

(52) U.S. Cl. ............... 428/304.4; 428/315.5; 428/315.7; 428/131

(58) Field of Classification Search .................. 428/34.1, 428/34.4, 34.6, 34.7, 34.8, 34.9, 35.2, 35.4, 428/35.7, 36.4, 36.5, 36.6, 36.7, 36.9, 36.91, 428/304.4, 313.3–313.9, 411.1, 474.4, 475.5, 428/480, 500, 515–523, 688, 315.5, 315.7, 428/131
See application file for complete search history.

(56) References Cited

U.S. PATENT DOCUMENTS

| | | | |
|---|---|---|---|
| 5,807,630 A | | 9/1998 | Christie et al. |
| 6,403,666 B1 | | 6/2002 | Nakayama et al. |
| 2005/0222316 A1 | | 10/2005 | Kato et al. |
| 2006/0182901 A1 * | | 8/2006 | Takagi .......................... 428/1.31 |

FOREIGN PATENT DOCUMENTS

| | | |
|---|---|---|
| AU | 647410 | 4/1991 |
| EP | 0492463 A2 | 1/1992 |
| JP | 64081831 | 3/1989 |
| JP | 02194035 | 7/1990 |
| JP | 02311546 | 12/1990 |
| WO | 9103516 A1 | 3/1991 |
| WO | 0029641 A1 | 5/2000 |
| WO | 0183318 A2 | 11/2001 |
| WO | 2006063957 A1 | 6/2006 |

* cited by examiner

*Primary Examiner* — Walter B Aughenbaugh

(74) *Attorney, Agent, or Firm* — Marsh Fischmann & Breyfogle LLP

(57) ABSTRACT

A permeable film or container for use in extending the storage life of a foodstuff or produce is provided. The film or container is formed from a plastics component, a porous component having a particle size smaller than the thickness of the film, and an acid component selected from at least one carboxylic acid compound in free or salt form. The permeable film is adapted for controlling the environment surrounding the foodstuff to reduce its respiration rate or senescence by controlling the transfer of gases, particularly oxygen and carbon dioxide, and build up of moisture. In one preferred embodiment the present invention provides a permeable film for use in the storage of a foodstuff, formed from a polymer component, a clay activated base component, and sorbic acid in free or salt form.

19 Claims, No Drawings

PERMEABLE FILMS

FIELD OF THE INVENTION

The present invention is directed to improvements in or relating to containers and permeable films. More particularly, but not exclusively, the invention is directed to modifying the permeability of films and containers for use in storing foodstuffs, and in particular respiring produce.

BACKGROUND OF THE INVENTION

In this specification, where a document, act or item of knowledge is referred to or discussed, this reference or discussion is not an admission that the document, act or item of knowledge or any combination thereof was at the priority date:
  (i) part of common general knowledge; or
  (ii) known to be relevant to an attempt to solve any problem with which this specification is concerned.

The term 'foodstuff' as used in this specification is intended to include any natural or processed food item that respires or breathes. Fresh produce (fruits and vegetables) is one example of a food item that is known to respire and is accordingly encompassed by the description 'foodstuff' as used herein. Accordingly some of the description of the invention which follows is directed to respiring produce, although it will be appreciated that the description is not intended to be so limited and encompasses other foodstuffs such as breads, and seafood, for example, live crustaceans.

The preservation of foodstuffs is an important issue for a number of reasons. Firstly, appropriate preservation techniques allow the producer of the foodstuff to be able to give assurances to customers that the product delivered will be in a form which is acceptable to them and to end users of the product. Secondly, appropriate preservation techniques can permit the shelf life or keeping of the product to be extended.

It is known that produce continues to draw oxygen from the atmosphere even following harvesting or picking, and converts it to gaseous carbon dioxide with some water vapour and other gases, which are then transmitted into the atmosphere.

It is also known that changes in the carbon dioxide and oxygen levels around the produce, as well as the level of other gases, can affect the storage life of the produce.

Temperature is another factor known to affect the rate of respiration of produce. For example, a temperature increase of 5 degrees Celsius is thought to contribute to a doubling of the respiration rate of some produce.

It is therefore important to try and slow the rate of respiration to reduce or delay the degree of spoilage of the produce.

A number of methods to control the respiration rate of produce are known in the prior art.

One method comprises so-called modified atmosphere packing, which involves adding a flushing or purging gas to a chamber in which the produce has been placed for storage or transport, so as to reduce the amount of oxygen in the chamber available to be consumed by the produce in the chamber. Often such chambers are fitted with temperature controls to control the temperature of the atmosphere inside the chamber.

Another method comprises the use of controlled permeability films in which the produce is placed for storage or transport. These films are, to a degree, capable of dictating to respiring produce the rate of transmission of oxygen from the atmosphere to the produce. In addition, the amount of carbon dioxide generated by the produce and present in the atmosphere immediately surrounding the produce, can be controlled.

U.S. Pat. No. 5,807,630 discloses one example of a controlled permeability film. The film comprises a film forming polymer, a dispersing polymer, and an inert porous filler. The filler may have a surface modifying agent coated thereon.

Australian Patent No 647410 discloses another example of a film to develop and maintain a controlled atmosphere. The film described comprises a polyethylene film impregnated with porous activated earth particles.

SUMMARY OF THE INVENTION

The present invention provides in a first aspect a permeable film for use in the storage of a foodstuff, the film comprising a plastics component, a porous base component, and a further component selected from at least one carboxylic acid, at least one salt of a carboxylic acid, and mixtures of any one or more thereof.

The present invention provides in a second aspect a permeable film for use in extending the storage life of a foodstuff, wherein the film is formed from a composition of components comprising:
  a) a plastics component;
  b) a porous component having a particle size smaller than the thickness of the film; and
  c) an acid component selected from at least one carboxylic acid compound in free or salt form.

Components according to the invention are selected so as to be suitable for use in forming products capable of safely containing, or being in safe contact with, foodstuffs.

In one embodiment, the composition of components can be selected for the application of the permeable film for use in forming a container for use in extending the storage life of a foodstuff. Preferably, the container is semi-rigid or rigid.

The present invention provides in another embodiment a container for use in the storage of a foodstuff, the container comprising a plastics component, a porous base component, and a further component selected from at least one carboxylic acid, at least one salt of a carboxylic acid, and mixtures of any one of more thereof.

Films and containers formed in accordance with the present invention are thought to exhibit beneficial modification to their permeability, with a resultant reduction or delay in the onset of degradation of a foodstuff placed in a bag formed from the film of the invention or in a container of the invention.

The term 'storage' as used in this specification is intended to encompass any of the various stages through which foodstuffs pass, namely packing, transport, presentation for sale, and keeping by the consumer.

Suitable components of film compositions according to the invention include components that can be heated and mixed together to form, for example, a film that can be applied to the surface of produce while maintaining the food within food safety guidelines for safe consumption.

Preferably, the film is suitable for controlling the environment surrounding the foodstuff to reduce its respiration rate or senescence.

The film according to the invention will typically be a flexible film. Preferably, the composition of components for the film is selected to provide properties to the film of pliability, strength and surface tension suitable for use in covering a foodstuff.

The film according to the invention will typically be substantially transparent to permit visual inspection of the contents of a bag or other receptacle formed from the film.

The film may be provided as a liner for a container into which a foodstuff is to be placed. It may be provided as a cover for a container into which a foodstuff has been placed. The film may be provided as both a liner and a cover for a single container.

The container according to the invention may take any suitable form. Typically the container will be a rigid or semi-rigid packaging form. In one embodiment the container may be a punnet for strawberries or other berries such as blueberries. In another embodiment the container may be a drawer of a refrigerated cabinet, such as a crisper. Other container configurations are envisaged within the scope of the invention.

A typical process for preparing a film or container according to the invention involves an initial step of adding the components to a process vessel, mixing them in the presence of heat, and allowing the mixture to cool to form a solid masterbatch. The masterbatch is a form of pre-film resin concentrate requiring further processing to form appropriate permeability characteristics. Typically the masterbatch is formed into pellets and stored in a moisture free environment because of its usually hydroscopic nature.

The masterbatch can then be further mixed with a plastics component and extruded to form a film or container having a desired characteristic such as shape or thickness. The forming of a flexible film in comparison to a rigid or semi rigid container requires the combination of a particular composition of masterbatch in combination with a particular type of plastics component. For example, polystyrenes are particularly suited to forming semi-rigid or rigid containers. Different types of extrusion processes can then be used to form either flexible films or sheets used in further thermoforming of containers. Containers are typically thermoformed from thicker sheets, for example a 600 micron sheet can be thermoformed into a container having a thickness in the range of from about 20-60 microns appropriate for use as 1 kg punnets.

The plastics component according to the invention may take any suitable form. It will typically be a polymer material. It may be a mixture of polymers. Typical plastics materials thought suitable for the invention include polyethylenes, low density polyethylene (LDPE), linear low density polyethylene (LLDPE), high density polyethylenes (HDPE), metallocenes, polypropylene, polystyrene, polyvinyl chloride (PVC), cellulose acetate, nylon, polyethylene terephthalate films, biodegradable films, and ionomer films, and mixtures of any one or more of the foregoing, with the proviso that the plastics material or resultant mixture is of food-grade standard. Further additives can be included for processability of products formed and in order to modify characteristics including strength, plasticity and surface tension. Masterbatch compositions will typically include a plastics component in addition to the plastics component added before extrusion to form the permeable film or container. Compositions of masterbatch are then paired with certain types of plastics component to give the desired characteristics needed for either a flexible film or alternatively a semi-rigid or rigid container. Polystyrenes, for example high impact polystyrenes, are particularly preferred for use in forming semi rigid or rigid containers. Metallocenes, LDPE, LLDPE PVC, HDPE and polypropylene are particularly preferred for use in forming flexible films.

A film or container will typically have a thickness in the range of from about 18-60 microns, preferably in the range of from about 21-35 microns. Generally, the greater the thickness of the film or container will result in decreasingly lower permeability levels. Typically, sheets of film used in forming rigid or semi-rigid containers will have a thickness in the range of from about 200-700 microns. For example, to form a 1 kg container having a thickness generally in the range of from about 20-60 microns, a sheet of film having a thickness of about 600 microns can be used.

The plastics component may be present in any suitable amount. Typically it will be present in an amount in the range of from about 50% to about 90% by weight in the masterbatch, and in the range of from about 75% to 98% by weight in the finished film.

The porous base component is thought to contribute to the generation of a microporous structure in the film or container, to thereby aid gas permeability of the film or container and to control gas transfer to and from a foodstuff contained in either a bag formed from a film according to the invention or in a container according to the invention. Ideally, the microporous structure provides a means for lowering the concentration of gases, including oxygen and carbon dioxide, while controlling the build up of moisture levels surrounding the surface of respiring produce, providing oxygen concentration levels are maintained above about 0.5%, preferably above 1%. Oxygen concentration levels below about 1% can cause anaerobic respiration leading to the damage of produce and facilitating growth of food borne pathogens. Preferably, the film is capable of maintaining oxygen concentration levels at a range of from about 1% to 5%.

The porous base component will typically comprise a mineral additive, such as a clay activated base. The porous base component may include a silica, alumina and/or aluminium oxide base, or a composition of alumina or silica based materials. It may comprise one or more activated earth minerals such as described in Australian Patent No 647410. For example, the activated earth mineral can be kaolin or calcined kaolin. Typically, the porous base component is dried before combining with other components.

The particles of the porous material comprising the porous base component may be of any suitable size. The particle size should not however exceed the intrinsic thickness of the film. Typically the particle size for the porous component will range from about 20 to about 150 microns. The particle size of the porous component is therefore selected for particular use with certain thicknesses of films or containers and can be altered according to such thicknesses as may be required.

The porous base component may be present in any suitable amount. Typically it will be present in an amount in the range of from about 30% to about 40% by weight in the masterbatch, in the range of from about 2% to 20% by weight in the finished film, and preferably in the range of from about 6% to 9% in the finished film. A typical proportion of the porous base component in the finished film is approximately 7.5% by weight.

The addition of the carboxylic acid component to a permeable film or container according to the invention is thought to overcome early formation of common rots and moulds in a foodstuff item such as that which comprises fresh produce. It is also thought to assist in absorbing any increase in condensation generated by the produce during a produce-stress phase. It is thought that in the absence of the carboxylic acid component and/or salt or mixture thereof any increase in the respiration rate of the produce can lead to higher levels of condensation inside a produce-containing bag or container formed according to the invention, which can pool in the base of the bag or container or fall onto the produce in large droplets, creating conditions for early deterioration.

During a produce respiration step for produce contained in a package such as a bag, oxygen is transmitted to the produce through the bag wall, and in turn carbon dioxide is transferred out through the bag wall to the atmosphere. During this gas transfer phase or interaction with the bag wall, small amounts of the carboxylic acid component or salt thereof are thought to be admitted to the inside of the bag to assist in preserving the bag or container contents. The carboxylic acid component may therefore be capable of migration from the film to the surface of the produce. The carboxylic acid component may also be selected to provide antimicrobial, preservative and/or hydrophilic properties, for example by using sorbic acid in free or salt form. Therefore, the acid component is preferably capable of incorporation into and migration from the film or container to assist in extending the storage life of produce.

Similar considerations, and in particular issues of condensation build-up and the resultant onset of mould, apply to other foodstuffs normally packaged in plastic films such as breads and crumpets.

Any carboxylic acid and/or salt thereof or mixture thereof may be used in the present invention with the proviso that the carboxylic acid, carboxylic acid salt, or resultant mixture thereof is of food-grade standard.

The carboxylic acid will typically be an unsaturated carboxylic acid, and preferably a polyunsaturated carboxylic acid. Preferably, the acid is a $C_5$-$C_{30}$ mono or polyunsaturated carboxylic acid, more preferably a $C_5$-$C_{12}$ mono or polyunsaturated carboxylic acid.

The carboxylic acid component preferably comprises sorbic acid and/or a salt thereof. It may accordingly comprise a mixture of sorbic acid and one or more salts of sorbic acid. Sorbic acid is approved for food-grade applications and is therefore safe for human consumption should any be deposited on the contents of a bag or container formed in accordance with the invention.

Salts of carboxylic acids will typically be metal salts thereof. Salts of alkali metals or alkaline earth metals are presently preferred. An example of a preferred alkali metal salt of sorbic acid is potassium sorbate. An example of a preferred alkaline earth metal salt of sorbic acid is calcium sorbate. These salts of sorbic acid are similarly approved for food-grade applications and are therefore considered safe for human consumption should they be deposited on the contents of a bag or container formed in accordance with the invention.

The carboxylic acid component or salt thereof may be present in any suitable amount. Typically it will be present in an amount in the range of from about 0.01% to about 10% by weight.

A film or container according to the invention may be further provided with a plurality of perforated holes to aid the gas permeability of the film or container. The number and size of the holes can be determined for specific foodstuffs and storage temperatures.

A preferred composition for a permeable film according to the present invention comprises:

from about 94.5% to about 96.5% by weight of a plastics component from about 3.5% to about 5.5% by weight of a porous base component, and from about 0.05% to about 0.525% by weight of a carboxylic acid component or a salt thereof.

A preferred composition for a container according to the present invention comprises:

from about 94% to about 97% by weight of a plastics component from about 3% to about 6% by weight of a porous base component, and from about 0.1% to about 1.5% by weight of a carboxylic acid component or a salt thereof.

Plasticizers such as glycerol, cross-linking agents, antioxidants, antimicrobial agents, preservatives, antifog agents or texture agents may also be added to modify the film or container as required for its specific use. Preferably, antimicrobial agents include metal ions supported in zeolite, isothiocyanate in cyclodextrin with cobalt ion, chitosan, allyl isothiocyanate, silver-based fungicide, quaternary ammonium salt, organic monoglycerides, copper and zinc, benzoic acid, sodium benzoate, sorbic acid, potassium sorbate and propionic acid. Preferably, the antimicrobial agents selected for incorporation into the film or container are capable of migration from the film or container onto the surface of the covered produce or foodstuff.

Typically, the film or container of the invention will be a monolayer. The film or container can also be formed from more than one layer. For example, a layer or film may comprise a lipid-containing sorbic acid layer, or may comprise a lipid-containing sorbic acid layer in combination with a hydrophilic base layer.

The present invention provides in another embodiment a permeable film for use in the storage of a foodstuff, the film comprising a polymer component, a clay activated base component, and sorbic acid or an alkali metal or an alkaline earth metal salt thereof.

The present invention provides in another embodiment a rigid or semi-rigid container for use in the storage of a foodstuff, the container comprising a polymer component, a clay activated base component, and sorbic acid or an alkali metal or alkaline earth metal salt thereof.

The present invention provides in another embodiment a sheet formed from the masterbatch or concentrate according to the invention.

The present invention provides in another embodiment a package comprising a container according to the invention and a covering for the container comprising a film according to the invention. The package can also comprise a container according to the invention and a liner for the container comprising a film according to the invention.

DESCRIPTION OF THE PREFERRED EMBODIMENT

The invention will now be further explained and illustrated by reference to the following embodiment.

A simulated retail display for grapes was established using industry-standard packages and containers formed in accordance with the invention. The purpose of this experiment was to subjectively assess for comparative purposes the relative quality of the grapes after a defined time period.

Thompson Seedless grapes packed into both the industry-standard packages (a transparent polyethylene bag) and containers (comprising a tray and a film covering, both formed in accordance with the invention) were stored at 5.5 degrees Celsius to approximate a retail refrigerated display, for approximately 4 weeks to determine their relative performance under simulated retail display.

Initial quality evaluations were made on a 1 to 5 scale between the grapes contained in the respective packages for visual quality, rots, off-odour and pack condensation. The initial quality of the grapes was comparable in each case. Progressive assessments of these characteristics were made over the 4 week period of the experiment.

After just over three weeks of the experiment, the grapes in two-thirds of the industry-standard packages were assessed to be unsaleable as compared to none in the containers formed in accordance with the invention.

Overall visual quality of the grapes at the end of the experiment was observed to be better maintained in a container formed in accordance with the invention, with the development of less stem and berry shrivelling and reduced berry yellowing, and less weight loss. There was also no obvious sign of visible rots on the grapes or condensation or free water in the containers formed in accordance with the present invention.

It is accordingly thought that these characteristics, demonstrating a delay in spoilage of the grapes and the maintenance of their saleability beyond normal industry standards, are attributable to the container formed in accordance with the invention.

It will also be understood that in order to facilitate extending the storage life of a foodstuff by use of a film according to invention as described herein, it is important to maintain control of the temperature of the foodstuff. Preferably, the produce should be stored in an environment having a temperature below about 8° C., more preferably at generally about 4° C. It will also be understood that optimal temperatures vary between different types of produce.

Rigid Films for Permeable Containers

High Impact Polystyrene (HIPS) is particularly useful as a primary carrier resin for producing permeable punnets or containers according to the invention. HIPS, such as Styron 5300, is particularly compatible with the specific masterbatch according to the present invention called MBSA-PS1 (see below). The masterbatch is a pre-formulation resin concentrate for use in combination with an additional selected resin. MBSA-PS1 is particularly used in combination with polystyrene resins. HIPS allows a cost effective reduction in the amount of masterbatch required to be added before mixing and extrusion of the permeable film according to the invention. Typically the amount of masterbatch added can be reduced from about 50% to about 10% while maintaining product performance. Lower levels of masterbatch can however be used although permeability levels will fall.

Punnets or containers can be produced via an integrated in-line process or via an offline process from a masterbatch resin concentrate in combination with a selected resin. Before mixing with the selected resin, the masterbatch concentrate should have a moisture level of less than about 0.1% to reduce any defects occurring during mixing or extrusion.

MBSA-PS1 masterbatch is typically formed into a pellet pre-film resin concentrate having the following composition:
 a) 35-40% polystyrenes (CAS 9003-53-8 & 9003-55-8);
 b) 45-50% activated clay particles (CAS 1327-36-2);
 c) 10% anti fog component (CAS 1338-39-2 & 31566-31-1);
 d) 5% preservative (CAS 24634-61-5 & 110-44-1).

The general process of forming a permeable container comprising MBSA-PS1 involves:
 i) adding 10% HIPS to 90% MBSA-PS1 (<0.1% moisture level) in auger
 ii) mixing thoroughly (about 10 minutes in typical auger)
 iii) placing mix into drying hopper and drying for between 30 minutes to 2 hours at 85-100° C.
 iv) extruding a plastic permeable sheet or film; and
 v) thermoforming into one or more containers.

Extrusion of the permeable film can be performed on a single or double screw extruder. Preferably the barrel has a minimum LD ratio of 32 to 1. The extruder and die temperature is approximately 200-230° C. Machine temperature zones are typically about 190-225° C. A 150 g punnet can be produced from a 350 micron sheet, a 500 g punnet from a 500 micron sheet and a 1 kg punnet from a 650 micron sheet. Preferably, the drawdown depth of extrusion of a 500 g punnet is 50 mm to create an effective permeability factor for gas exchange. Thermoformed containers typically have a thickness in the range of from about 20-60 micron, which is suitable for the desired permeability ratios. It is important that extrusion produces a dispersion of a homogenous mix to enable appropriate thermoforming. It is recommended that no barrier screws are used and screen packs are recommended. When running MBSA-PS1 at 10% add rate, automatic pressure control should be set at about 1500 PSI or higher.

Containers of greater thickness generally have lower permeability levels, which can be compensated by using lids on such containers having a much higher degree of permeability. Preferably, the lids are manufactured from polystyrene and include an antifog component to mitigate the formation of condensation of the lid arising from produce respiration. Antifog components can be incorporated into the film or container or coated on the exterior surface of the film or container.

Typical antifog lid coatings include alkoxylated alcohols, preferably any one or more of the compounds of $R-O-(CH_2-(CH_3)_m-CH_2-O-)_n-H$ where m=0-1, n=1-11 and R=alkyl aryl or alkyl. Antifog components or surfactants aid in the formation of significantly smaller droplets of condensation resulting from respiring produce.

The word 'comprising' and forms of the word 'comprising' as used in this description do not limit the invention claimed to exclude any variants or additions.

Modifications and improvements to the invention will be readily apparent to those skilled in the art. Such modifications and improvements are intended to be within the scope of this invention.

What is claimed is:

1. A permeable film for use in extending the storage life of a foodstuff, wherein the film is formed from a composition of components comprising:
 a) a plastics component;
 b) a porous base component comprising a plurality of particles having a particle size smaller than the thickness of the film; and
 c) an acid component comprising a carboxylic acid provided in the form of sorbic acid in free or salt form.

2. The film according to claim 1, wherein the composition of components is selected to form a film positionable with respect to or at least partially defining a container for use in controlling the environment surrounding the foodstuff to reduce its respiration rate or senescence.

3. The film according to claim 1, wherein the plastics component is present in an amount in the range of from about 75% to 98% by weight in the film.

4. The film according to claim 1, wherein the plastics component comprises one or more polymers selected from the group consisting of polyethylenes, low density polyethylene, linear low density polyethylene, high density polyethylene, metallocenes, polypropylene, polystyrene, polyvinyl chloride, cellulose acetate, nylon, polyethylene terephthalates, biodegradable polymers, ionomers, and mixtures thereof.

5. The film according to claim 1, wherein the porous base component is capable of generating a microporous structure in the film to facilitate gas permeability for controlling gas transfer to and from a foodstuff covered with said film.

6. The film according to claim 5, wherein the porous base component includes a mineral additive.

7. The film according to claim 6, wherein the mineral additive includes a clay activated base or at least one activated earth mineral.

8. The film according to claim 1, wherein the form of the sorbic acid is potassium sorbate or calcium sorbate.

9. The film according to claim 1, wherein the acid component is present in an amount in the range of from about 0.01 to 10% by weight in the film.

10. The film according to claim 1, further comprising a plurality of perforations to facilitate gas permeability.

11. The film according to claim 10, whereby the number and size of the perforations are adapted for application with the type of foodstuff at a specific range of storage temperatures.

12. The film according to claim 1, wherein the film is substantially transparent.

13. The film according to claim 1, wherein the composition of components is selected to form a flexible film adapted to have a pliability and surface tension suitable for use in covering a foodstuff.

14. The film according to claim 1, wherein the composition of the film comprises:
   a) from about 94.5% to about 96.5% by weight in the film of the plastics component;
   b) from about 3 5% to about 5.5% by weight in the film of the porous base component; and
   c) from about 0.05% to about 0.525% by weight in the film of the acid component.

15. The film according to claim 1, wherein the composition of the film comprises from about 3.5% to about 5.5% by weight in the film of the porous base component.

16. A permeable film for use in extending the storage life of a foodstuff, wherein the film is formed from a composition of components comprising:
   a) a plastics component;
   b) a porous base component comprising a plurality of particles having a particle size smaller than the thickness of the film; and
   c) an acid component comprising at least one carboxylic acid provided in the form of sorbic acid in free or salt form;
   wherein the particle size of the particles of the porous base component is in the range of from about 20 to 150 microns, with the proviso that the particle size is less than the thickness of the film.

17. The film according to claim 16, wherein the porous base component is present in an amount in the range of from about 2% to 20% by weight in the film.

18. The film according to claim 17, wherein the porous base component is present in an amount in the range of from about 6% to 9% by weight in the film.

19. The film according to claim 18, wherein the porous base component is present in an amount of about 7.5%.

* * * * *